June 23, 1970    R. GUDMESTAD    3,516,313
CUT-OFF DEVICE FOR STRIP MATERIAL
Filed April 16, 1968    4 Sheets-Sheet 1

INVENTOR
RAGNAR GUDMESTAD
BY Lieber & Nilles
ATTORNEYS

June 23, 1970 R. GUDMESTAD 3,516,313
CUT-OFF DEVICE FOR STRIP MATERIAL
Filed April 16, 1968 4 Sheets-Sheet 2
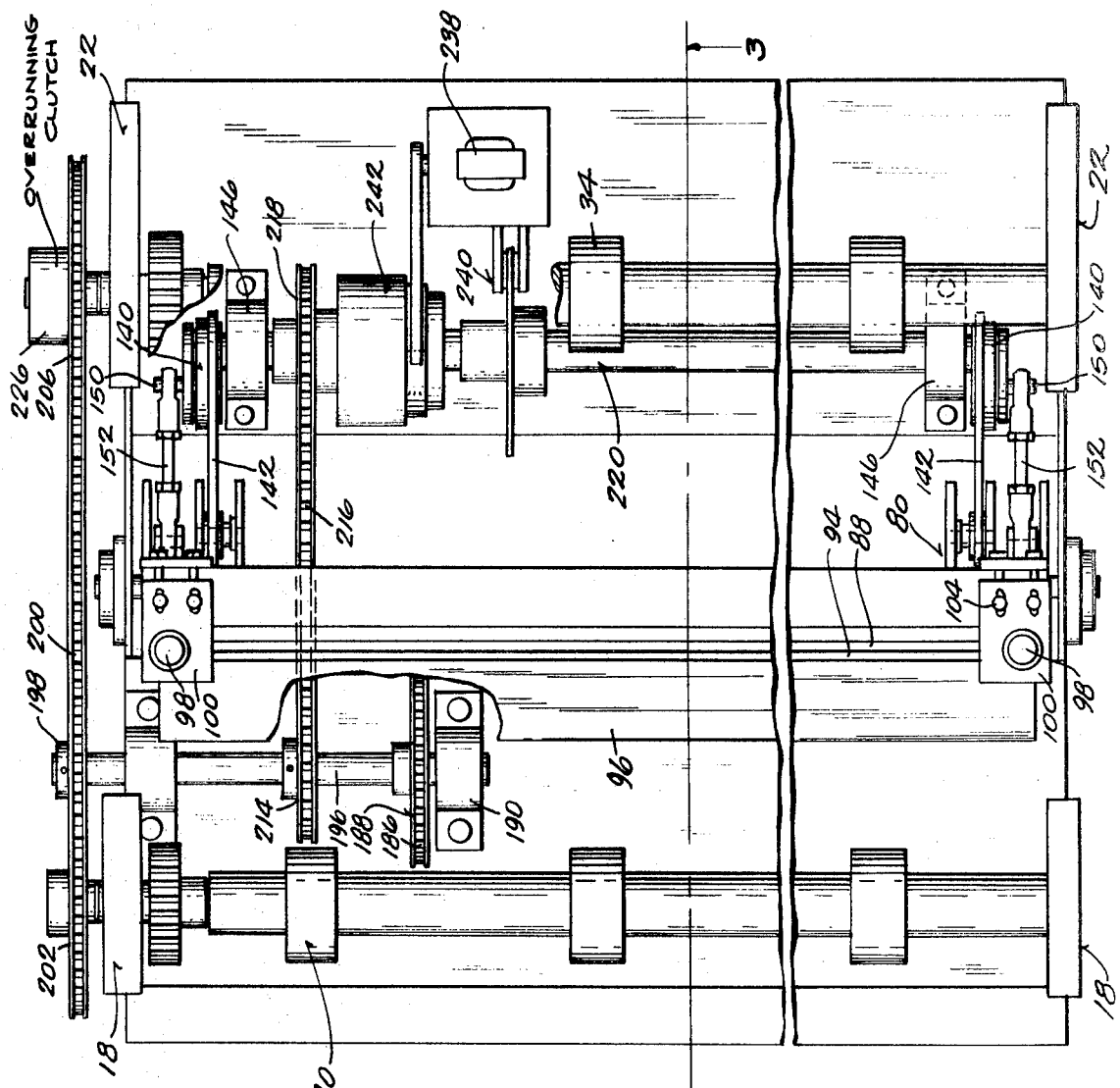
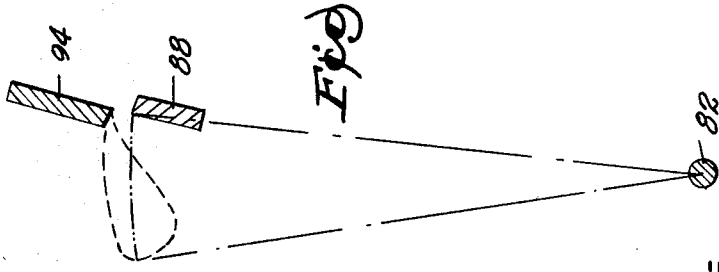
INVENTOR
RAGNAR GUDMESTAD
BY Lieber & Nilles
ATTORNEYS June 23, 1970
R. GUDMESTAD
3,516,313
CUT-OFF DEVICE FOR STRIP MATERIAL
Filed April 16, 1968
4 Sheets-Sheet 3
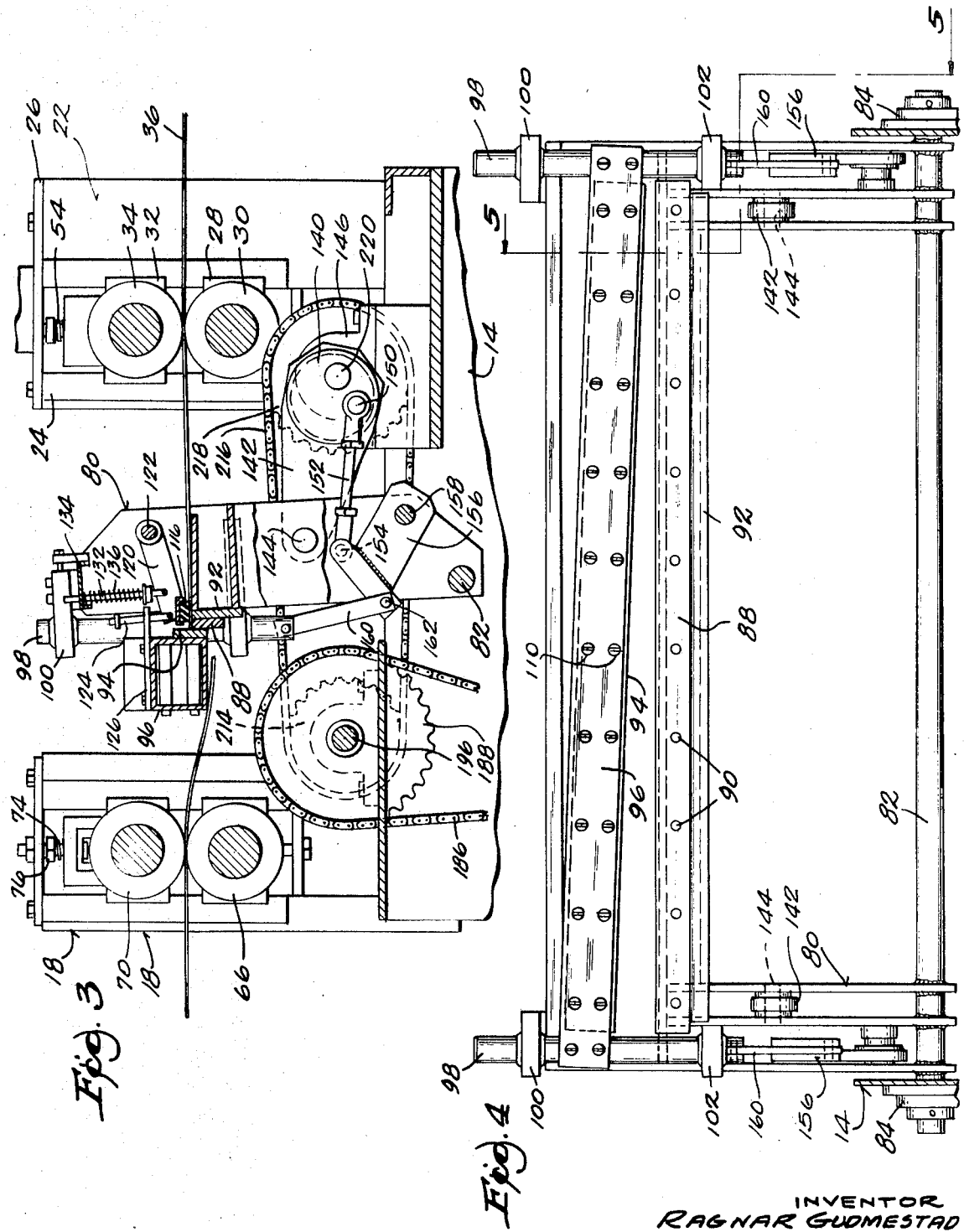
INVENTOR
RAGNAR GUDMESTAD
BY Lieber & Nilles
ATTORNEYS

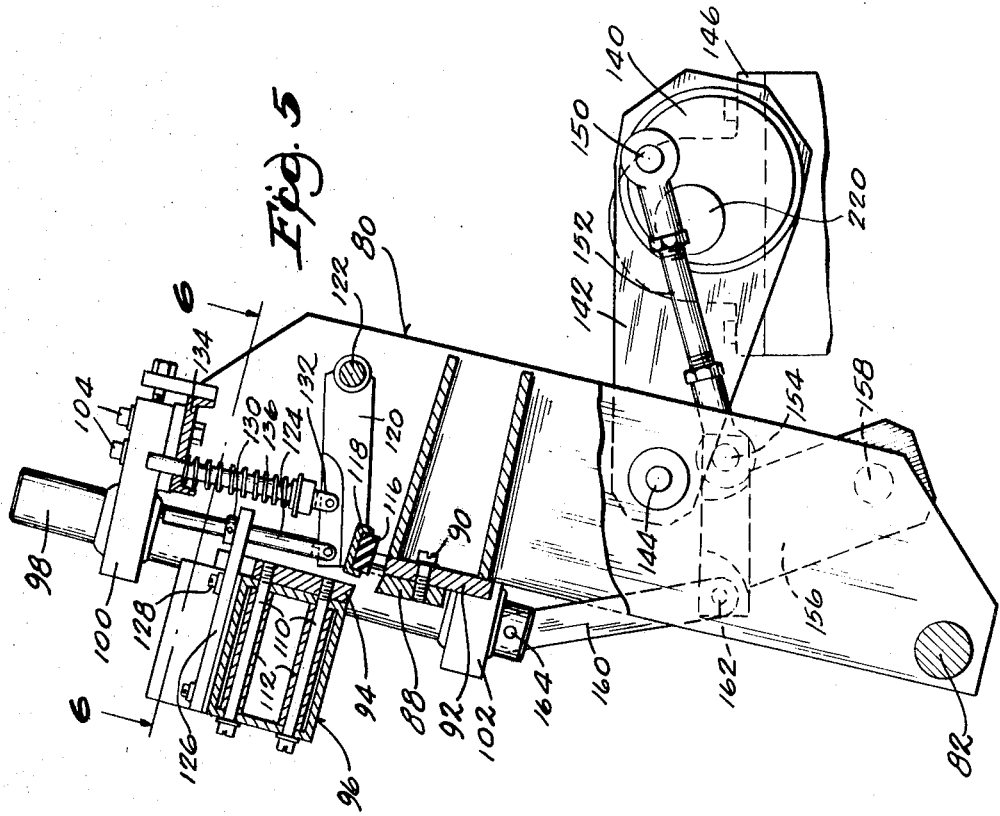
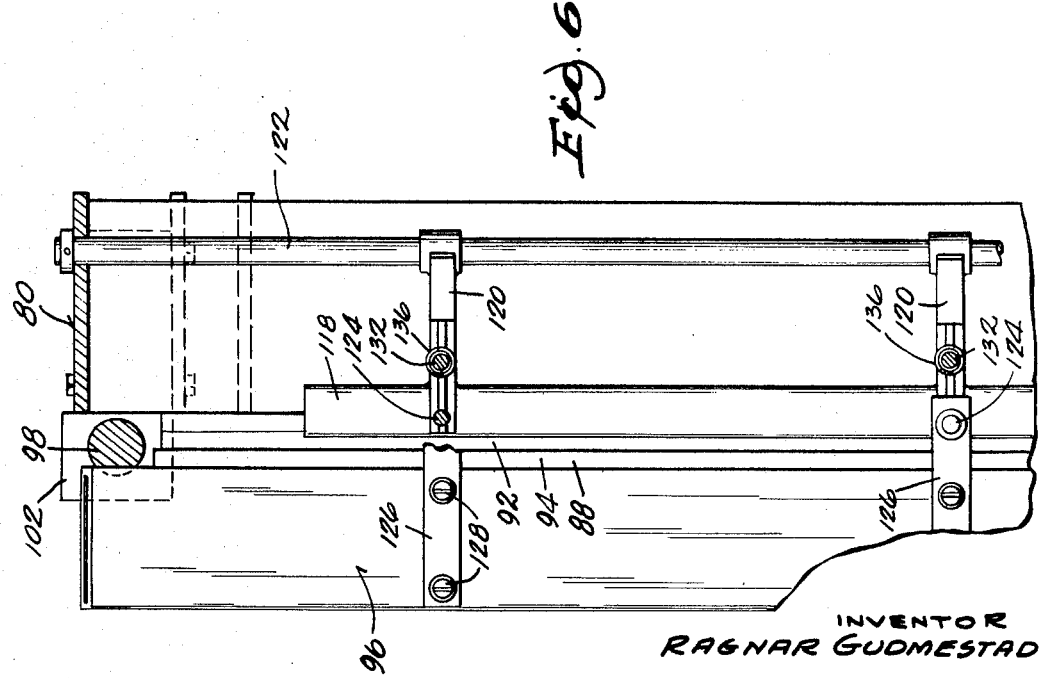

United States Patent Office

3,516,313
Patented June 23, 1970

3,516,313
CUT-OFF DEVICE FOR STRIP MATERIAL
Ragnar Gudmestad, West Allis, Wis., assignor to Artos Engineering Company, New Berlin, Wis., a corporation of Wisconsin
Filed Apr. 16, 1968, Ser. No. 721,863
Int. Cl. B23d 25/06, 25/16, 1/56
U.S. Cl. 83—110          15 Claims

ABSTRACT OF THE DISCLOSURE

A cut-off device or flying shear for severing successive sections of predetermined length from a continuously advancing strip of material wherein the strip advancement means and the cut-off mechanism are driven by a common power source and are accurately synchronized.

BACKGROUND

Various types of apparatus have heretofore been proposed for use in severing a strip of material into successive sections of predetermined lengths. These prior devices have incorporated diverse types of shear blades or knives and actuating mechanisms therefor. In some instances, the cutting blades or knives have been carried by rotatable members operated in timed relation to bring the knives into cooperative cutting relation as the strip is advanced between the rotatable knive holders. In other instances, the cutting knives have been carried by a stationary vertical support with means being provided for reciprocating one of the knives relative to the other transversely to the path of travel of the strip material through the cutting zone. In still other instances, the knives or blades are carried on a pivotally mounted support which is arcuately movable in timed relation with the advancement of the strip, and one of the knives is also mounted for reciprocating movement in a plane transverse to the path of travel of the strip material.

In all of the previously proposed shearing or cut-off machines, various objections have been encountered. For example, in some of the prior devices, more than one power source was required for separately driving the strip material and the cut-off or shearing mechanism, and these drive mechanisms required accurate synchronization and rather complicated timing and actuating mechanisms. In other shearing or cut-off devices, the severance of the continuously moving strip of material into sections of predetermined length required means for retarding or momentarily stopping the moving strip at the severance zone so that the shearing blades could be activated to cut the strip into the desired lengths, and the shearing operation was accordingly undesirably slow due to this intermittent operation. Other devices for cutting or shearing strip material into successive lengths embodied means for compensating for the retardation or momentary stoppage of the moving strip at the shearing machine during the shearing operation, and in some such devices, it is common practice to impart a curvature to the advancing metal strip as the cut is made in order to compensate for the momentary pause required during engagement of the strip by the cutting blades.

In any event, the cutting or severance of the strip material transversely thereacross as it is continuously advanced along a predetermined path has posed a problem which has not previously been solved with complete satisfaction. In such machines, it is desirable to continuously advance the strip material to be severed as rapidly as possible and without slow-downs necessitated, for example, by the cutting or severing operation. tI is also important that the successive sections or lengths be cut from the advancing strip with utmost accuracy so that the severed lengths are of uniform size. In addition, it is important that the machines be ajustable so as to accommodate strip material of various sizes and to operate on such strip to sever lengths or sections therefrom of various desired lengths. Such machines should also be durable and compact while also being as simple as possible for ease of operation and maintenance.

SUMMARY

It is therefore an object of the present invention to provide a cut-off device in the nature of a flying shear which is extremely simple, compact and durable in construction and which is extremely accurate and efficient in operation.

Another object of the invention is to provide a cut-off machine for severing successive sections of predetermined length from a continuously advancing strip which is driven by only a single power source and which is extremely rapid in operation.

Still another object of this invention is to provide a portable and self-contained cut-off device or flying shear which is extremely flexible in its adaptations and which is readily adjustable to accommodate or operate on a variety of materials of different widths and thicknesses and to accurately sever the same into any desired lengths.

A further object of the invention is to provide an improved flying shear wherein the cutting knives are accurately synchronized for performance of the successive severance operations without need for slowing the advancement of the strip material being operated upon, and in which the successive severed lengths or sections are effectively conveyed away from the cutting zone at a faster rate of speed than the advancement of the strip so as not to interfere with the cutting operations while also permitting the performance of subsequent cutting operations in accurately timed relation to the position of the forward or leading edge of the continuously advancing strip.

An additional object of the invention is to provide a shear mechanism wherein the strip material to be operated on is advanced at a constant uniform speed with the cut-off or shearing mechanism being actuated in response to the position of the advancing strip and operable to perform the shearing operation while moving in the same direction as the strip and at the same speed, the severed section being then removed from the cut-off zone at a greater speed than the rate of advancement of the strip.

In accordance with the present invention, the strip to be severed is advanced along a rectilinear path and a shear carrier is pivotally mounted for swinging movement in an arcuate path intersecting the plane of movement of the strip, the carrier having a lower fixed blade and an upper blade mounted thereon for rectilinear reciprocating movement toward and away from the fixed blade, the carrier being operable in timed relation with the strip advancing means for swinging the same from a starting position in the direction of movement of the strip and then back to starting position, and the movable shear blade being operable in timed relation with the strip advancing means and with the swinging movement of the carrier for reciprocating the same toward and away from the fixed blade.

These and other objects and advantages of the invention and of the mode of operation of a typical flying shear embodying the improvements will become apparent from the following detailed description.

THE DRAWINGS

A clear conception of the several features constituting this invention may be had by referring to the drawings accompanying and forming a part of this specification wherein like reference characters designate the same or similar parts in the various views.

FIG. 2 is a plan view of the device with portions thereof being broken away to reveal normally concealed structure;

FIG. 3 is a vertical longitudinal section taken along the line 3—3 of FIG. 2 with the shear mechanism shown in extended cut-off position;

FIG. 4 is a transverse section taken generally along the line 4—4 of FIG. 1;

FIG. 5 is a somewhat enlarged vertical section through the shear mechanism taken generally along the line 5—5 of FIG. 4;

FIG. 6 is a similarly enlarged transverse section through the upper portion of the shear mechanism taken along the line 6—6 of FIG. 5; and FIG. 7 is a schematic diagram depicting the movement of the shear blades from starting position, through shearing position and return to starting position.

DETAILED DESCRIPTION

Figure 1:
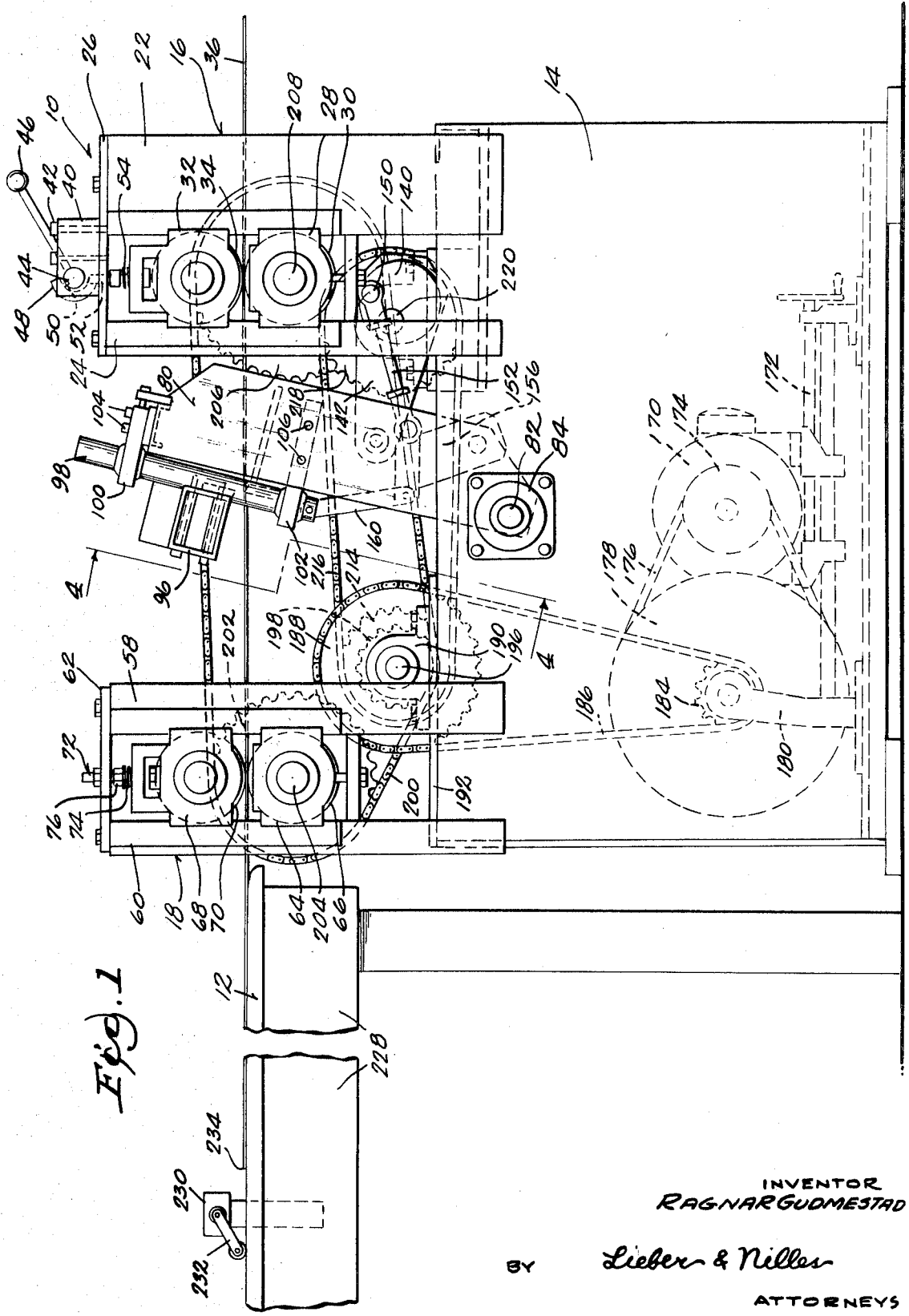
FIG. 1 is a side view of a typical cut-off device embodying the invention and showing a strip of material to be severed into sucessive lengths as it advances through the cutting zone prior to the start of a cutting operation.

While the invention has been shown and described herein as being embodied in a unitary more or less portable cut-off device operating on a continuously advancing strip of sheet material with the severed sections being delivered to a receiving platform and with a particular type of switch mechanism being employed for determining the lengths of the sections to be severed, it should be understood that it is not intended or desired to unnecessarily limit or restrict this invention to the particular arrangement and usage thus shown and described since the novel features may be used in different adaptations. It is also intended that certain descriptive terminology used herein shall be given the broadest possible interpretation consistent with the disclosure.

Referring to the drawings, the portable cut-off machine 10 is shown as delivering the material being operated upon to a receiving structure 12. The cut-off device 10 is shown as a self-contained unit mounted in a main frame 14. The main frame 14 inclues a pair of longitudinally spaced upright frames 16, 18 adjacent the opposite ends thereof.

The upright frame 16 supports the feed mechanism receiving the material to be operated upon from a continuous supply source and includes a pair of spaced uprights 22, 24 at the opposite ends of the frame, each set of uprights 22, 24 being joined at their upper ends by a plate 26 or the like. Mounted on each set of uprights 22, 24 is a bearing assembly 28 adapted to rotatably receive the opposite ends of a driven feed roll 30. Also mounted on and between each set of uprights 22, 24 above the bearing assembly 28 is an upper bearing assembly 32 for rotatably receiving the opposite ends of a cooperating feed roll 34. The strip material 36 to be severed into predetermined lengths is received by and between the rolls 30, 34 and is supplied thereto from a suitable source.

The roll 30 is continuously driven as will hereinafter be more fully described, and the upper roll 34 is preferably adapted to be disengaged at the will of an operator. While any suitable mechanism may be employed for the purpose of disengaging the roll 34, it has been found convenient to utilize mechanism of the type shown herein. Such mechanism is shown as including a bearing block 40 mounted on the plate 26 of each set of uprights 16, each bearing block being secured to its corresponding supporting plate 26 as by means of bolts 42. A shaft 44 spans the space between the laterally spaced upright frames 16 and is received at its opposite ends in the bearing blocks 40, the shaft 44 being provided with an actuating handle 46. Each end of the shaft is also operatively connected with a spanner link 48 as by means of a pin 50, and each of the spanner links 48 is pivotally secured to the upper end of a link 52 which is, in turn, attached to the adjacent upper bearing assemblage 32, a spring 54 being provided on each of the links 52 for constantly urging the bearing assemblage 32 and the roll 34 carried thereby toward the lower bearing assemblage 28 and the drive roll 30. The handle 46 of the roll disengage mechanism may thus be manually operated to raise or lower the upper roll 34 out of and into driving engagement with the roll 30.

The upright support 18 at the opposite end of the frame 14 also comprises a pair of spaced uprights or posts 58, 60 at each side of the main frame 14. Mounted on and between each set of posts 58, 60 is a bearing assemblage 64 for receiving the opposite ends of a driven roll 66. Mounted on and between each set of uprights or posts 58, 60 above bearing assemblage 64 and driven roll 66 is another bearing assemblage 68 for rotatably receiving and supporting a cooperating roll 70.

The upper bearing assemblages 68 and roll 70 are preferably constantly resiliently urged toward the lower bearing assemblages and driven roll 66. For this purpose, it is convenient to utilize a simple pressure applying device such as shown herein, but other suitable means may be employed for this purpose. As shown, a bolt 72 is secured to the top plate 62 above each of the upright bearing assemblages 68, and the lower end of this bolt carries a spring 74 compressed between an abutment 76 or the like on the bolt and the adjacent bearing assemblage 68. Thus, each bearing assemblage 68 and the upper roll 70 is constantly urged toward the adjacent lower bearing assemblage 64 and into operative contact with lower drive roll 66. It should, of course, be understood that if it is found desirable, the pressure applying device 72, 74, 76 may be replaced by the releasable or disengageable mechanism 40 to 54 inclusive as hereinabove described.

Interposed between the upright roll supporting frames 16, 18 is a cutting assemblage which provides the cutting or severance zone. Such cutting mechanism comprises a frame formed by a pair of shear or blade carriers 80 supported on a pivot shaft 82 for arcuate swinging movement, the carriers 80 being located at or adjacent to each of the side walls of the main frame 14, the opposite ends of the pivot shaft 82 being supported in suitable bearings 84. The pivotally mounted shear or blade carriers 80 intersect the plane of movement of the strip 36 on opposite sides of the strip, and the carriage frame thus provided is movable in an arcuate path in timed relation with the advancement of the strip material as will hereinafter more fully appear.

Spanning the space between the carriage arms 80 and fixedly secured thereto at a point below the path of the strip material 36 is a lower fixed shear blade 88, the fixed blade 88 being secured to the arms 80 in any suitable manner as by means of bolts or screws 90 and mounting bracket 92. A movable shear blade 94 is mounted above the fixed blade 88 for reciprocation along the carriage arms 80 toward and away from the fixed blade. As shown, the upper blade may be conveniently secured to a blade or shear holder 96, and the shear holder is, in turn, secured at opposite ends of the blade 94 to a pair of parallel rods 98 which are slidably received in a pair of spaced upper and lower brackets 100, 102 respectively. The brackets 100, 102 are, in turn, secured to the carrier arms 80 in a suitable manner as, for example, by means of the bolts or screws 104 and 106 respectively. Thus, the fixed and movable blades 88, 94 respectively are swingable along with the carriage provided by the carrier arms 80 in an arcuate path intersecting the plane of movement of the strip 36, the blade 94 additionally being adapted for reciprocation along the carriage 80 toward and away from the fixed blade 88 as will hereinafter be more fully described.

The shear blades or knives 88, 94 are mounted on their respective supports so that their cooperating cutting edges are inclined relative to each other in a customary manner as shown in FIG. 4 and the supporting plate or strip 92 may be extended entirely across the space between the carriage arms 86 for purposes of rigidity in instances wherein the spanning distance requires. Also, the upper knife 94 may be strengthened by extending the blade holder 96 entirely across the space between the arms 80 and by attaching the knife to the holder at a number of spaced intervals across the spanning area as by means of a series of spaced bolts or machine screws 110 with suitable spacers 112 being carried by these bolts between the opposite walls of the knife holder 96, and if desired, additional rigidity may be obtained by externally threading the spacers 112 and screwing them into the blade holder 96.

It will be understood that the knives 88, 94 may be rendered adjustable, and it is also preferable to provide suitable hold-down means extending transversely across the strip 36 immediately adjacent the severance zone. For this purpose, a transverse pad 116 is shown as being carried by channel shaped holder 118 which is mounted on the swinging end of a lever arm 120 pivoted at its opposite end on a shaft 122. The swinging end of the lever arm 120 is provided with a link 124 guided in its movement in the overhanging portion of a plate 126 secured in a suitable manner as by means of screws or bolts 128 to the knife holder 96, the link 124 having an adjustable stop member 130 normally positioning the link with respect to the plate 126 and plate holder 96. The lever arm 120 is additionally provided with a link 132 connecting the swinging end of the lever arm with the support 134 and the upper slide bracket 100, and interposed between the support 134 and the lever arm 120 is a spring 136 or the like for constantly resiliently urging the swinging end of the lever arm 120 and the positioning pad 116 carried thereby toward the strip of material 36 being operated upon. The hold-down pad 116 and its attendant mechanism is accordingly carried upwardly away from the strip material along the upper blade 94 and its blade holder 96 to permit passage of the strip 36 through the cutting zone, and the blade holder 116 is brought into active hold-down position by the spring 136 when the blade 94 is reciprocated downwardly on its cutting stroke.

Each of the pivotally mounted carriage arms 80 is connected for swinging movement to an eccentric 140 by means of a crank arm 142 pivotally secured as at 144 to an intermediate portion of its respective arm 80. Thus, as the eccentric 140 is rotated, the carriage frame provided by the arms 80 is swung in an arcuate path from a starting position as shown in FIG. 1 to a strip severing position as shown in FIG. 3 and then back to starting position, it being understood that the eccentric 140 may be in the nature of a cam or crank which may be conveniently mounted on the main frame as by means of supporting stand and bearing assemblage 146.

The rods or slides 98 which carry the reciprocating blade 94 and blade holder 96 along with their attendant structure are connected to another eccentric 150 as by means of a crank arm or link 152 pivotally connected as at 154 with a bell crank or lever 156 pivoted as at 158, the swinging end of the lever or bell crank 156 being connected to the lower end of slides or rods 98 by means of a link 160, the link 160 being pivotally secured at one end to the bell crank as at 162 and at its other end to the respective guide rods 98 as by pivot 164. Thus, as the eccentric 150, which may again be in the form of a cam or crank, is rotated, the lever or bell crank 156 will be rocked about its pivot shaft 158 by the link or crank arm 152 and such movement will be transmitted to the upper blade 94 and its holder 96 through the link connection 160 between the swinging end of the bell crank and the lower end of the slide rods 98, it being understood that the eccentric 150 may also be mounted on the support 146 along with the eccentric 140.

The driven rolls 30 and 66 as well as the arcuately swingable shear carriage 80 and the reciprocating upper shear blade 94 are all driven in synchronism by a single power source, and the movement of the shear blades or knives in relation to the swinging of the shear carriage and advancement of material is diagrammatically depicted in FIG. 7. As shown, the power is supplied by a suitable drive motor 170 mounted on a base 172 and connected through a variable drive pulley 174 and belt or chain 176 to a pulley 178 rotatably journalled in a frame 180. The pulley 178 carries a sprocket 184 which drives a chain 186 drivingly associated with a sprocket 188 which may be conveniently mounted in a bearing assemblage 190 supported on a platform 192 secured to the main frame 14.

Keyed to the shaft 196 of the sprocket 188 is a sprocket 198 meshing with a chain 200 for driving the same. The chain 200 which is driven by the sprocket 198 in turn meshes with the teeth of a sprocket 202 keyed to the shaft 204 of the lower roll 66 mounted on the roller stand 18. The chain 200 also meshes with the teeth of another sprocket 206 which is keyed to the shaft 208 of the lower roll 30 carried by the roller stand 16. Thus, as the motor 11 is operated to drive the sprocket or pulley 178, the chain 186 drives sprocket 188 which, in turn, drives sprocket 198 which is keyed to the same common shaft 196. As the sprocket 198 is thereby driven, the chain 200 is also driven to simultaneously drive the rollers 66, 30 through the respective sprockets 202 and 206. For purposes which will hereinafter become apparent, sprocket 202 driving the roll 66 is of smaller diameter than the sprocket 206 which drives the roll 30. Thus, the roll 66 is driven at a somewhat faster rate of speed than the roll 30.

Also, keyed to the shaft 196 is a sprocket 214, and this sprocket 214 has its teeth meshing with a chain 216 which, in turn, meshes with the teeth of a sprocket 218 to drive the same. The sprocket 218 is keyed to the shaft 220 which drives both of the eccentrics 140, 150. Thus, as the sprocket 188 is driven as hereinabove described, the sprocket 214 is also driven to drive the sprocket 218 through the chain 216 and thereby rotate the shaft 220 which serves to actuate the shear carriage 80 and the reciprocating shear blade 94 through their respective cams and connections.

In operation, the strip material 36 supplied from a suitable source (not shown) is advanced to the nip of the cooperating draw rolls 30, 32 and with the machine properly adjusted, the motor is started to drive the various parts through the variable drive 176, 178. The sprocket 188 is driven by the chain 186 to drive the shaft 196 which, in turn, drives the rolls 66, 30 through the chain 200. Since the sprocket 202 driving the roll 66 is of smaller diameter than the sprocket 206 driving the roller 30, the roller 66 is driven at a faster peripheral speed than the roller 30. However, to compensate for this differential in peripheral speed of the driven rolls 66, 30, the drive shaft for the roll 30 is provided with an over-running clutch 226 of any suitable well known construction. Thus, the driven roll 30 and roll 34 cooperate to pull the strip 36 to be severed and advance the same through the cutting zone and between the knives 88, 94 thereof to the draw rolls consisting of the driven roll 66 and cooperating roll 70.

Advancement of the strip 36 is thereupon continued to advance the forward end of the strip across a suitable support such as a platform 228. At a predetermined locality on the platform 228 dependent upon the desired length sections to be cut is a switch 230. The switch 230 has a trip lever 232 located in the path of movement of the strip 36 and adapted to be contacted and tripped by the leading edge 234 of the strip. The trip lever 234 is electrically connected in a suitable manner with a solenoid 238 which is operable in a well known manner to actuate a brake 240 and permit rotation of the cam shaft 220 which is also provided with a clutch of the single revolution type such as that known as a Hilliard clutch 242, Hilliard clutch 242 being interposed between the drive sprocket 218 and the eccentrics 140, 150. Thus, with the brake 240 disengaged and the clutch 242 operably connecting the sprocket 218 with the cranks or cams 140, 150, these cams are driven to arcuately swing the shear carriage 80 counterclockwise from the position shown in FIG. 1 to that shown in FIG. 3. At the same time, the knives or shear blades 88, 90 are swung in an arcuate path along with the carriage 80 and during such swinging movement, the upper blade member 94 is reciprocated downwardly toward and across the path of the strip 36 and cooperates with the lower knife 88 to sever the strip.

The drive sprockets and synchronized actuating mechanisms for the feed rolls, shear blade carriage 80 and upper reciprocable knife 94 are so adjusted and timed that the rate of arcuate movement of the carriage 80 is the same as the rate of rectilinear movement of the strip 36 at the time the cutting or severance takes place, and the carriage 80 along with the knives 88, 94 is caused to over-travel or arcuately move a short distance beyond the point of severance of the strip as the upper knife or shear blade 94 is reciprocated upwardly away from the knife 88 and strip. Also, immediately upon severance of the strip, the severed section is removed by the cooperating draw rolls 66, 30 at a faster rate of speed than the rate of travel of the strip 36 due to the differential in speed at which the rolls 66, 30 are driven. When the carriage 80 has reached the extent of its arcuate movement and the blade 94 has been withdrawn away from the strip and the blade 88, the carriage and the blades carried thereby are returned in a clockwise direction to starting position. This sequence of operations thereupon continues with successive sections of the strip 36 being severed as the strip is continuously advanced.

Various modes of carrying out the invention are contemplated as being within the scope of the following claims particularly pointing out and distinctly claiming the subject matter which is regarded as the invention.

I claim:

1. A shear for severing successive sections of predetermined length from an advancing strip of material comprising, means including a pair of cooperating feed rolls for advancing the strip to be severed along a rectilinear path past a cutting zone, a shear carrier pivotally mounted for swinging movement in an arcuate path intersecting the plane of movement of said strip, a lower shear blade fixedly mounted on said carrier below said advancing strip, an upper shear blade mounted on said carrier above said advnacing strip for rectilinear reciprocating movement toward and away from said lower shear blade, means operable in timed relation with said strip advancing means for arcuately swinging said carrier from a starting position in the direction of advancement of said strip and then back to starting position, and means operable in timed relation with said strip advancing means and with the swinging movement of said carrier for reciprocating said upper shear blade along said carrier toward and away from said lower shear blade whereby the strip is severed during its advancement by the shear blades as they are swung in an arcuate path by said carrier in the direction of advancement of said strip, and a pair of cooperating draw rolls located beyond said shear carrier in the direction of strip movement, said draw rolls being driven at a greater rate of speed than the feed rolls to remove the severed section of the strip away from the cutting zone faster than the rate of advancement of the unsevered strip, said draw rolls and feed rolls both being driven from a common drive source and the feed rolls being provided with an over-running clutch.

2. Shearing apparatus according to claim 1, wherein the upper shear blade is mounted on laterally spaced parallel rods which are slidably mounted on the carrier for reciprocating movement.

3. Shearing apparatus according to claim 2, wherein the upper shear blade is carried by holders which are adjustably secured to the rods and the rods are slidably carried in spaced brackets which are adjustably secured to the carrier.

4. Shearing apparatus according to claim 1, wherein the strip advancing means, the shear carrier and the upper shear blade are all actuated in timed relation from a common drive source.

5. Shearing apparatus according to claim 1, wherein the carrier is swung in the direction of travel of the strip to move the shear blades in an arcuate path at the same speed as the rate of travel of the strip during the severing operation.

6. Shearing apparatus according to claim 5, wherein the carrier is swung beyond the strip severance point in the direction of travel of the strip while the upper shear blade is reciprocated away from the leading edge of the strip.

7. Shearing apparatus according to claim 6, wherein the upper shear blade is reciprocated to move the same toward and into cooperative strip severance relation with the lower blade when the rate of arcuate travel of the blades and the strip is the same, and to retract and move the same away from the lower blade and the path of the advancing strip while the rate of arcuate travel of the blades is at least as great as the rate of advancement of the strip.

8. A shear for severing successive sections of predetermined length from an advancing strip of material comprising, means for advancing the strip to be severed along a rectilinear path past a cutting zone, a shear carrier pivotally mounted for swinging movement in an arcuate path intersecting the plane of movement of said strip, means for limiting arcuate swinging movement of the carrier and for arresting the movement thereof at its starting position until a predetermined length of the strip has advanced through the cutting zone, a lower shear blade fixedly mounted on said carrier below said advancing strip, an upper shear blade mounted on said carrier above said advancing strip for rectilinear reciprocating movement toward and away from said lower shear blade, means operable in timed relation with said strip advancing means for arcuately swinging said carrier from a starting position in the direction of advancement of said strip and then back to starting position, and means operable in timed relation with said strip advancing means and with the swinging movement of said carrier for reciprocating said upper shear blade along said carrier toward and away from said lower shear blade whereby the strip is severed during its advancement by the shear blades as they are swung in an arcuate path by said carrier in the direction of advancement of said strip.

9. Shearing apparatus according to claim 8, wherein means responsive to strip advancement is provided for initiating arcuate swinging movement of the carrier from its starting position to strip severance position.

10. Shearing apparatus according to claim 9, wherein the means for initiating arcuate swinging movement of the carrier is adjustable.

11. Shearing apparatus according to claim 1, wherein the means for arcuately swinging the shear carrier includes an eccentric and a link connected to the pivotally mounted carrier.

12. Shearing apparatus according to claim 11, wherein the means for reciprocating the upper shear blade includes an eccentric and actuating linkage interconnecting the eccentric and the upper shear blade.

13. Shearing apparatus according to claim 12, wherein the actuating linkage interconnecting the eccentric and upper shear blade includes a bell crank and a link and slide interconnecting the bell crank and upper shear blade.

14. Shearing apparatus according to claim 12, wherein the eccentric for swinging the shear carrier and the eccentric for reciprocating the upper shear blade are actuated simultaneously through a common drive shaft.

15. Shearing apparatus according to claim 14, wherein the means for advancing the strip and the drive shaft for the eccentrics are driven from a common drive source.

References Cited

UNITED STATES PATENTS

| | | | |
|---|---|---|---|
| 1,417,609 | 5/1922 | Koerner | 83—316 X |
| 2,623,589 | 12/1952 | Price et al. | 83—110 |
| 3,078,751 | 2/1963 | Hill | 83—293 X |
| 3,178,974 | 4/1965 | Roess | 83—292 X |
| 3,224,310 | 12/1965 | Bieri | 83—316 X |
| 3,277,759 | 10/1966 | Brombach et al. | 83—316 X |

WILLIAM S. LAWSON, Primary Examiner

U.S. Cl. X.R.

83—292, 294, 317